(12) United States Patent
Nelson

(10) Patent No.: US 6,917,808 B1
(45) Date of Patent: Jul. 12, 2005

(54) INTER-FREQUENCY HANDOFF EVALUATION METHOD

(75) Inventor: Eric Peter Nelson, Wharton, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/561,833

(22) Filed: Apr. 28, 2000

(51) Int. Cl.[7] ............................................. H04Q 7/20
(52) U.S. Cl. .................... 455/436; 455/440; 455/67.11; 455/226.1; 370/332
(58) Field of Search ................................ 455/436, 437, 455/438, 439, 440; 370/331, 332, 333

(56) References Cited

U.S. PATENT DOCUMENTS

| | | | |
|---|---|---|---|
| 5,999,816 A * | 12/1999 | Tiedemann, Jr. et al. ... | 455/437 |
| 6,295,452 B1 * | 9/2001 | Choi ............................ | 455/436 |
| 6,304,755 B1 * | 10/2001 | Tiedemann, Jr. et al. ... | 455/437 |
| 6,321,089 B1 * | 11/2001 | Han ............................. | 455/438 |
| 6,393,276 B1 * | 5/2002 | Vanghi ....................... | 455/422.1 |
| 6,546,248 B1 * | 4/2003 | Jou et al. .................... | 455/434 |
| 6,553,064 B1 * | 4/2003 | Chen et al. ................. | 375/224 |
| 6,587,446 B2 * | 7/2003 | Sarkar et al. ............... | 370/331 |

* cited by examiner

Primary Examiner—Temica M. Beamer

(57) ABSTRACT

An improved inter-frequency handoff trigger in a wireless communication system is disclosed. In an embodiment of the invention, a particular mobile station transmits a pilot strength measurement message to the base station. The base station subsequently determines the strongest border pilot and the strongest interior pilot. The base station evaluates whether the border sector is stronger than the interior sector. If the border sector is stronger than the interior sector, this would indicate that the mobile station is out of the coverage area of the interior pilot. The base station subsequently determines the transmitted pilot energy to total transmit power of the pilot signal associated with the border pilot. The transmitted pilot energy to total transmit power of the border pilot is then compared to an aggregate value of a set of pilot energy signals received at the mobile station and if the difference exceeds a threshold value, the handoff of the mobile station to the border sector base station is initiated.

20 Claims, 3 Drawing Sheets

US 6,917,808 B1

INTER-FREQUENCY HANDOFF EVALUATION METHOD

FIELD OF THE INVENTION

This invention relates generally to wireless communication systems and, in particular, to inter-frequency handoffs in wireless communication systems.

BACKGROUND OF THE INVENTION

Wireless communication systems typically include a mobile switching center ("MSC") and a plurality of base stations ("BS") coupled to the MSC. Each of the base stations provides wireless communication services to mobile stations ("MS") within geographical coverage areas referred to herein as cells. Associated with each wireless communication system are communications channels over which user traffic may be transmitted between the base stations and the mobile stations—those channels being derived from a portion of the radio frequency spectrum allocated to wireless communication applications.

To more effectively utilize the available frequency spectrum, wireless communication systems generally have incorporated multiple access techniques, such as frequency division multiple access ("FDMA"), time division multiple access ("TDMA") and code division multiple access ("CDMA"). In FDMA and TDMA based systems, the frequency spectrum is partitioned into sets of narrow frequency bands (e.g., 30 kHz). In FDMA based systems, each narrow frequency band is used to define a traffic channel over which user traffic may be transmitted between a base station and a mobile station. In TDMA based systems, a traffic channel is defined by a narrow frequency band with time slots assigned for individual call connections. Thus, in TDMA based systems (as opposed to FDMA), more than one traffic channel may be defined using the same narrow frequency band. Typically, in FDMA and TDMA based wireless communication systems, base stations use distinct and unique narrow frequency bands to reduce co-channel interference.

In CDMA based wireless communication systems, the frequency spectrum for a given base station includes only one wide frequency band, typically having a bandwidth of 1.25 MHz or wider. A traffic channel is defined, in part, by the wide frequency band and unique codes associated with individual users or subscribers. Although traffic channels in neighboring cells may use the same wide frequency band, co-channel interference (between base stations in neighboring cells) is reduced as a result of spreading gain attributable to the unique direct sequence codes which define the traffic channels. If the available frequency spectrum is partitioned into two or more wide frequency bands, co-channel interference may be further reduced by using different wide frequency bands to define traffic channels in neighboring cells.

Regardless of the multiple access technique employed by the wireless communication system, a traffic channel needs to be assigned to a mobile station before any call is placed by or to the mobile station. Specifically, the traffic channel is assigned to the mobile station by the base station associated with the cell in which the mobile station is physically located. As long as the mobile station stays within the same cell, the mobile station may use the same traffic channel for the duration of the call. If the mobile station moves to another cell during the call, a handoff will be performed between the base station associated with the new cell and the base station associated with the old cell. Handoffs in which a mobile station switches between traffic channels using the same frequency band are referred to herein as intra-frequency handoffs. By contrast, handoffs in which a mobile station switches between traffic channels utilizing different frequency bands are referred to herein as inter-frequency handoffs. It should be noted that inter-frequency handoffs occur in FDMA and TDMA, as well as CDMA based wireless communication systems.

Inter-frequency handoffs in a CDMA system can occur in a variety of circumstances. For instance, a region of high demand, such as an urban area, may require a greater number of frequencies to service demand rather than a lower demand region surrounding it. Sometimes it is not cost effective to deploy all available frequencies throughout the system. Thus, a call originating on a frequency deployed only in the high demand area will incur an inter-frequency handoff as the mobile station user travels to a less congested area.

In another circumstance, an inter-frequency handoff may occur between adjacent service areas, which may involve movement by the mobile between adjacent cells in the same wireless system or between separate, but contiguously located wireless systems. Such adjacent service areas may offer service on different frequencies, which will require the mobile station to be handed off to a different frequency in order to provide call continuity.

One concern associated with inter-frequency handoffs is a tendency for the mobile station to oscillate between two frequencies. This occurs when a mobile station is initially handed off to a new frequency and then subsequently returns to the old frequency. Such a situation is referred to herein as "ping-ponging." In geographical areas where the old and new frequencies are both characterized by strong RF signals, ping-ponging is a potential problem. Another concern associated with inter-frequency handoffs is the occurrence of dropped calls. Specifically, inter-frequency handoffs are somewhat more likely to experience a failure of the mobile station to establish communications with the base station operating at the new frequency (for a variety of reasons), thereby resulting in dropped calls.

Handoffs between base stations are initiated by a trigger mechanism, and an inter-frequency handoff is predicated on a particular trigger. When the conditions for an inter-frequency trigger are met, a conventional inter-frequency handoff process is initiated. Existing inter-frequency handoff triggers rely on $$\frac{E_C}{I_O}$$

measurements at a particular mobile station—

$$\frac{E_C}{I_O}$$

being a ratio of pilot energy per chip to the total received power spectral density at the mobile station antenna.

$$\frac{E_C}{I_O}$$

can also be viewed essentially as a digital signal-to-noise ratio. However, measurements at fixed geographic locations are subject to extreme variations due to traffic loading. For example, for a one-cell mobile communication system, during unloaded or lightly loaded conditions, the mobile received $$\frac{E_C}{I_O},$$

may be −3 dB, while during high loading, the mobile received $$\frac{E_C}{I_O}$$

at the same location may be −10 dB. In order to avoid situations where no inter-frequency handoff trigger is reached during low traffic loading, the $$\frac{E_C}{I_O}$$

based trigger must be set to a very high ratio, typically on the order of −3 dB. However, this can result in an unnecessary amount of inter-frequency handoffs occurring during high traffic loading and a significant reduction in the offered traffic load. Lower ratio triggers will increase dropped calls due to the unpredictability of loading, but may result in higher offered traffic loads.

Therefore, there exists a need for improving the reliability of inter-frequency handoffs, to consequently minimize the number of dropped calls, to minimize the occurrence of ping-ponging and to increase the offered traffic load by developing a more reliable and accurate inter-frequency handoff trigger.

SUMMARY OF THE INVENTION

The present invention provides an improved trigger for an inter-frequency handoff. By improving the reliability of an inter-frequency handoff trigger, the overall reliability of the wireless system is improved. In particular, an improvement in the reliability and repeatability of the handoff trigger reduces the frequency of dropped calls and increases the offered traffic load on the carrier configured for inter-frequency handoff. Additionally, oscillation of inter-frequency handoffs ("ping-ponging")between the initial connection frequency and the new frequency are minimized.

In the implementation of a handoff process according to the method of the invention, a particular mobile station transmits a pilot strength measurement message to the base station. The mobile may recognize pilots for one or more "interior" base stations (which are assumed to all be operating at the same frequency (f1) as the serving base station) and for one or more "border" base stations (which may be operating on either the same frequency as the serving base station (f1) or on a different frequency (f2), or both). In that case the serving base station subsequently determines the strongest border pilot and the strongest interior pilot. The serving base station evaluates whether the border sector pilot is stronger than the interior sector pilot. A determination that the border sector pilot is stronger than the interior sector pilot provides an indication that a handoff to the border sector base station should be considered—i.e. that the mobile station has moved into the coverage area of the border sector base station. If there are no interior pilots in the active set it is assumed that the mobile station is out of the coverage area of the interior pilots and the base station does not evaluate the border pilot versus interior pilot threshold.

If the mobile station is determined to have moved into the coverage area of the border pilots, the serving base station subsequently determines a pilot energy signal parameter for the strongest border pilot in the active set. That pilot energy signal parameter is then compared to an aggregate value of a set of pilot energy signals received at the mobile station and if the difference exceeds a threshold value, the handoff of the mobile station to the border sector base station is initiated.

DETAILED DESCRIPTION

The present invention will be illustrated below in conjunction with an exemplary IS-95 code division multiple access ("CDMA") wireless communication system. In a CDMA wireless communication system, a common frequency band is used for communication with a number of base stations in a system. The common frequency band allows simultaneous communication between a mobile station and more than one base station. Signals occupying the common frequency band are discriminated at the receiving station through the spread spectrum CDMA waveforms based on the use of a high rate pseudonoise ("PN") code. The high rate PN code is used to modulate signals transmitted from the base stations and the mobile stations. Transmitter stations using different PN codes produce signals that can be separately received at the receiving station. The high rate PN modulation also facilitates the recovery by the receiving station of the correct signal where the signal has traveled over several different propagation paths. Although the present invention is particularly well suited for use within a CDMA communication system and is so described with respect to this application, it is also applicable for use in conjunction with other wireless communication systems, including FDMA and TDMA systems.

Figure 1:
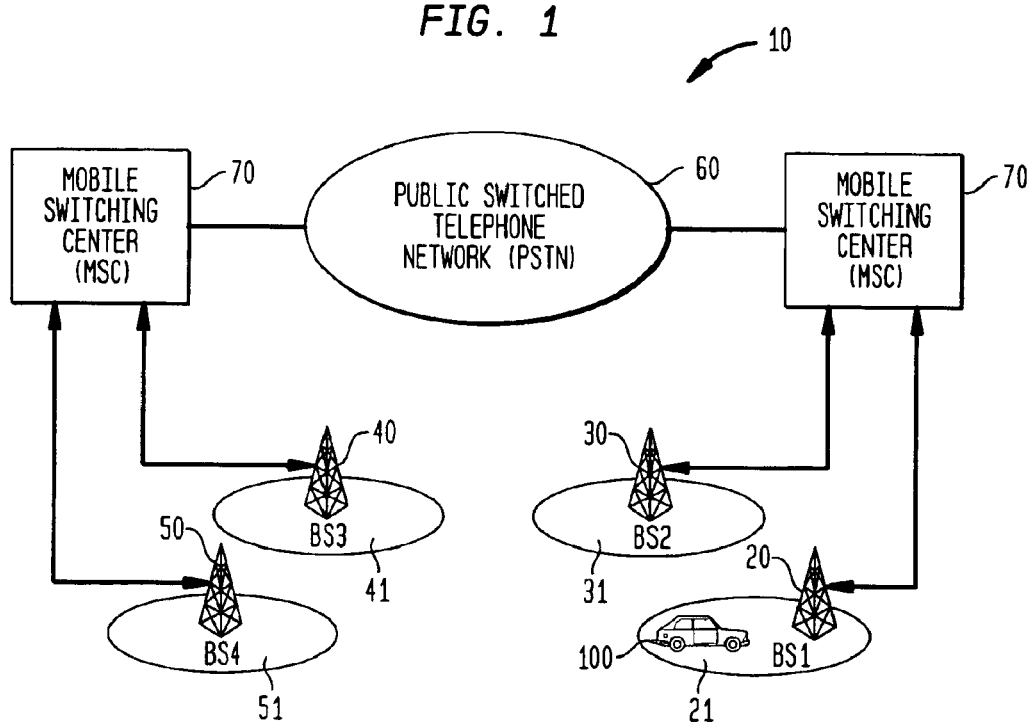
FIG. 1 shows a schematic diagram of an exemplary code division multiple access ("CDMA") wireless communication system in which inter-frequency handoffs in accordance with the invention may be implemented.

Referring to FIG. 1, there is shown a cellular communication system 10 including four base stations BS1, BS2, BS3 and BS4, labeled respectively 20, 30, 40 and 50, and at least one mobile station 100. The cellular communication system 10 is an exemplary embodiment of a code division multiple access CDMA cellular communication system, such as that set forth in the Telecommunications Industry Association/Electronic Industries Association Interim Standard 95 (IS-95). In the cellular communication system 10, each base station is coupled to a mobile switching center ("MSC") 70 that is in turn coupled to a public switched telephone network ("PSTN") 115 using known techniques.

The geographic coverage provided by communication system 10 is divided into coverage areas referred to as cells, illustrated schematically as 21, 31, 41 and 51, where each cell corresponds to a base station. The cell may be further divided into multiple sectors (not shown). Each base station transmits an identifiable pilot signal that serves as a beacon for mobile stations that are in the cell served by that base station. Base stations communicate with mobile stations through a forward link (base station to mobile station) which includes a channel for the pilot signal and other traffic channels. Mobile stations communicate with base stations through a reverse link (mobile station to base station) which includes a channel for mobile stations to report the detected pilot signal energy to total received power at a particular mobile station via a pilot strength measurement message ("PSMM").

When the mobile station is engaged in a call, the mobile station may use the same traffic channel for the duration of the call, as long as it remains within the same cell. If, however, the mobile station moves to another cell during the connection, a handoff will be performed between the primary base station in control of the mobile station and the base station of the new cell. Handoffs in which a mobile station switches between traffic channels defined using the same frequency band are referred to as intra-frequency handoffs. Handoffs in which a mobile station switches between traffic channels defined using different frequency bands are referred to as inter-frequency handoffs. An improved method for mobile station inter-frequency handoff within a CDMA based wireless communication system according to the invention is hereafter described.

In an exemplary CDMA system, each base station transmits a pilot signal having a common PN spreading code that is offset in code phase from the pilot signal of other base stations. During operation, a particular mobile station is provided with a list of code phase offsets corresponding to border base stations surrounding the serving base station, through which the primary communications channel is established. Border base stations and border sectors are neighboring or intersecting cells which may be operating at either the same frequency as that of the serving base station (hereafter sometimes referred to as the "first frequency" or as "f1") or at a different frequency than the serving base station (hereafter sometimes referred to as the "second frequency" or as "f2"), or at both f1 and f2, and will be configured to perform inter-frequency handoffs for the particular mobile station. Interior base stations and sectors are normally operating at the same frequency as the serving base station (f1) and, accordingly, would not ordinarily be required to perform an inter-frequency handoff for the particular mobile station. The mobile station is equipped to track the signal strength of the pilot signal from a group of base stations including the neighboring base stations.

As noted above, all base stations in a service area generate a pilot signal which may be used by mobiles operating in the service area to identify a base station and to evaluate its signal strength. The active set for a given mobile station is the set of pilots for base stations through which active communications channels are established. A border set is the set of pilots for base stations surrounding interior base stations comprising the base stations that have a high probability of having a pilot signal strength of sufficient level to establish communication with the mobile station. Border sector base stations may be operating on the same frequency as the serving base station (f1) or on a different frequency (f2), or both, and accordingly are configured to perform both inter-frequency and intra-frequency handoffs. An interior set is a set of base stations having a pilot signal strength of sufficient level to establish communication with the particular mobile station and normally operating at the same frequency (f1) as the serving base station.

When communications are initially established, a mobile station communicates through the serving base station and the active set contains only the pilot for that serving base station. The mobile station monitors the pilot signal strength of the base stations of the active set, the candidate set—i.e., the set of pilots that have been received by the mobile station with sufficient strength to be successfully demodulated, but have not been placed in the active set by the serving base station—and the neighbor set—i.e., the set of pilots associated with base stations that are probable candidates for handoff. When a pilot signal of a base station in the neighbor set exceeds a predetermined threshold level, the base station is added to the candidate set and removed from the neighbor set at the mobile station. The mobile station communicates a message to the serving base station identifying the new base station. A wireless communications system controller decides whether to establish communication between the new base station and the mobile station. The wireless communications systems controller sends a message to the new base station with identifying information about the mobile station and a command to establish communication with the mobile station if the decision is made to add the base station to the active set for a particular mobile station. A message is also transmitted to the mobile station through the serving base station identifying a new active set that includes the serving and the new base stations. The mobile station searches for the new base station transmitted information signal and communication is established with the new base station without termination of communication through the serving base station.

When the mobile station is communicating through multiple base stations, it continues to monitor the signal strength of the base stations of the active set, the candidate set, and the neighbor set. Should the signal strength corresponding to a base station of the active set drop below a predetermined threshold for a predetermined period of time, the mobile station generates and transmits a message to report the event. The wireless communication system controller receives the message through at least one of the base stations with which the mobile station is communicating. The wireless communication system controller may decide to terminate communications through the base station having a weak pilot signal strength.

The wireless communications system controller, upon terminating communications through a base station, generates a message identifying a new active set of base stations, which does not contain this base station. The base stations through which communication is established send a message to the mobile station. The mobile station communications are routed only through base stations identified in the new active set.

Figure 2:
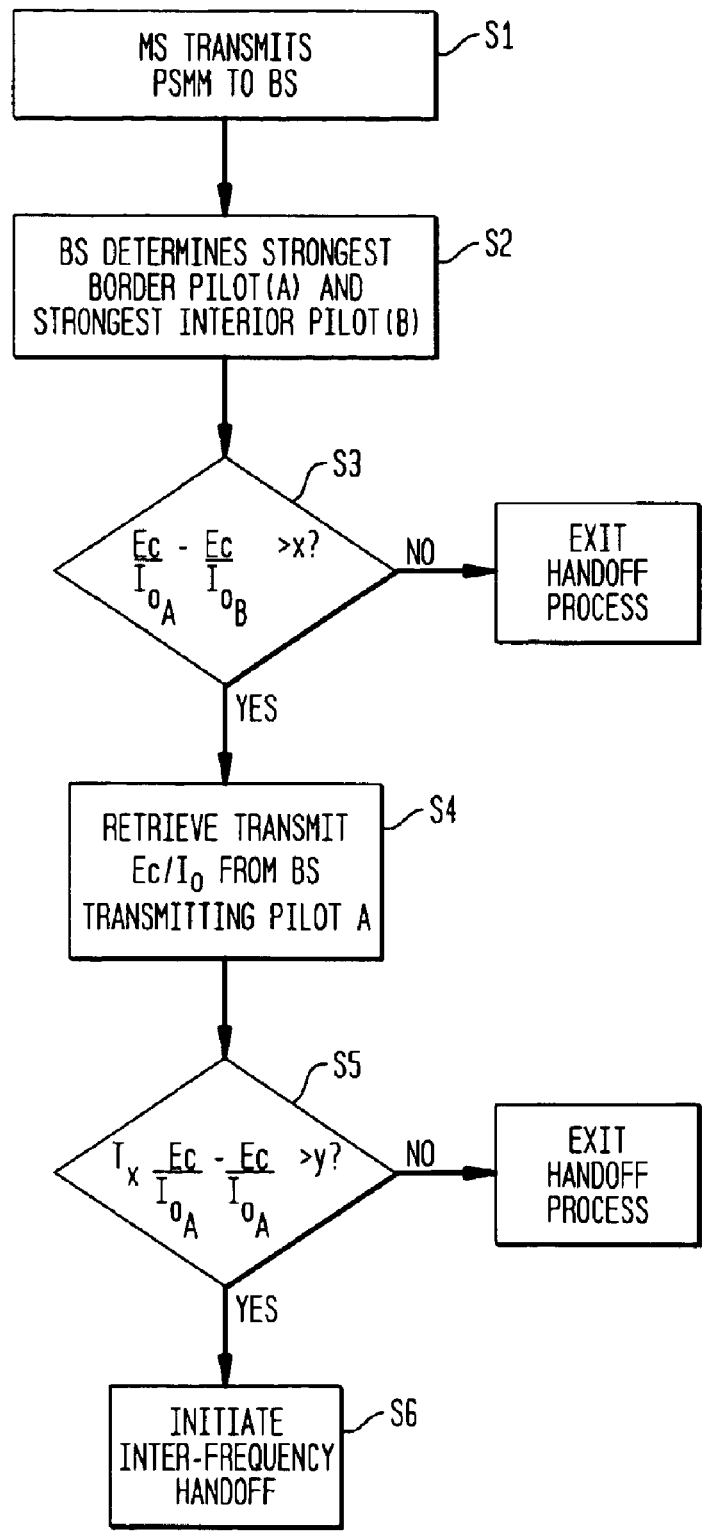
FIG. 2 shows a flowchart illustrating an exemplary prior art inter-frequency handoff process.

In the case of a mobile station moving to a border sector operating at a different frequency than its serving base station, an inter-frequency evaluation algorithm is applied to determine whether a handoff should be made to the base station operating at the new frequency. An exemplary prior art inter-frequency handoff evaluation methodology is illustrated by the flowchart shown in FIG. 2. At step S1 of the flow chart, a particular mobile station transmits a pilot strength measurement message ("PSMM") over the reverse link to the primary base station. The PSMM lists the set of pilot channels detected during repeated searches performed by the mobile station including the pilot energy per chip to the total received power spectral density and PN phase at which each pilot channel was received.

At step S2, the primary base station determines if the active set contains both border pilots and interior pilots. If the active set contains both border pilots and interior pilots, at step S3, the primary base station sorts, by a hardware or software implementation, among the pilot channels, to determine the strongest border pilot and the strongest interior pilot received at the particular mobile station. The PSMM received from a particular mobile station identifies the pilot energy associated with the detected pilot channels. If the active set only contains border pilots, the handoff trigger method skips to step S5. At step S4, the primary base station computes the difference between the ratios of the pilot energy to total received power measurements (expressed $$\frac{E_C}{I_O}$$

) of the strongest border pilot (designated A), $$\frac{E_C}{I_{OA}},$$

and of the strongest interior pilot (designated B)

$$\frac{E_C}{I_{OB}},$$

and compares that difference against a Border Pilot versus Interior Pilot metric X. If the condition $$\frac{E_C}{I_{OA}} - \frac{E_C}{I_{OB}} > X$$

is not met, the handoff procedure is halted for the particular base station.

If the condition $$\frac{E_C}{I_{OA}} - \frac{E_C}{I_{OB}} > X$$

is met, at step S5, the primary base station retrieves the transmitted pilot energy to total transmit power from the particular base station associated with the strongest border pilot channel. At step S5, the primary base station initially computes the transmitted pilot energy to total transmit power $$\frac{TxE_C}{I_O}.$$

The transmitted pilot energy to total transmit power is calculated as a ratio of the energy transmitted over the pilot signal of the particular base station to the total energy transmitted on the forward link for that particular base station. Therefore, $$\frac{TxE_C}{I_O}$$

is calculated as:

$$\frac{TxE_C}{I_O} = \frac{TxE_{C\_pilot}}{\text{Total\_transmit\_power}}$$

The $$\frac{TxE_C}{I_{OA}}$$

is subsequently compared to the received pilot energy to total received power of the strongest border pilot channel as reported by the mobile station, $$\frac{E_C}{I_{OA}},$$

and the difference is compared against a loss metric, Y. If both the conditions $$\frac{E_C}{I_{OA}} - \frac{E_C}{I_{OB}} > X$$

and $$\frac{TxE_C}{I_{OA}} - \frac{E_C}{I_{OA}} > Y$$

are met, the inter-frequency handoff process is initiated at step S6 for the particular mobile station using known techniques.

This prior art inter-frequency handoff evaluation method may prematurely trigger an inter-frequency handoff when multiple pilots of similar $$\frac{TxE_C}{I_O}$$

are in the active set due to interference from multiple active set pilots. Additionally, when numerous pilots are in 10 the active set, the evaluation method does not account for variations in the transmitted signal energy from the other pilots in the active set.

Figure 3:
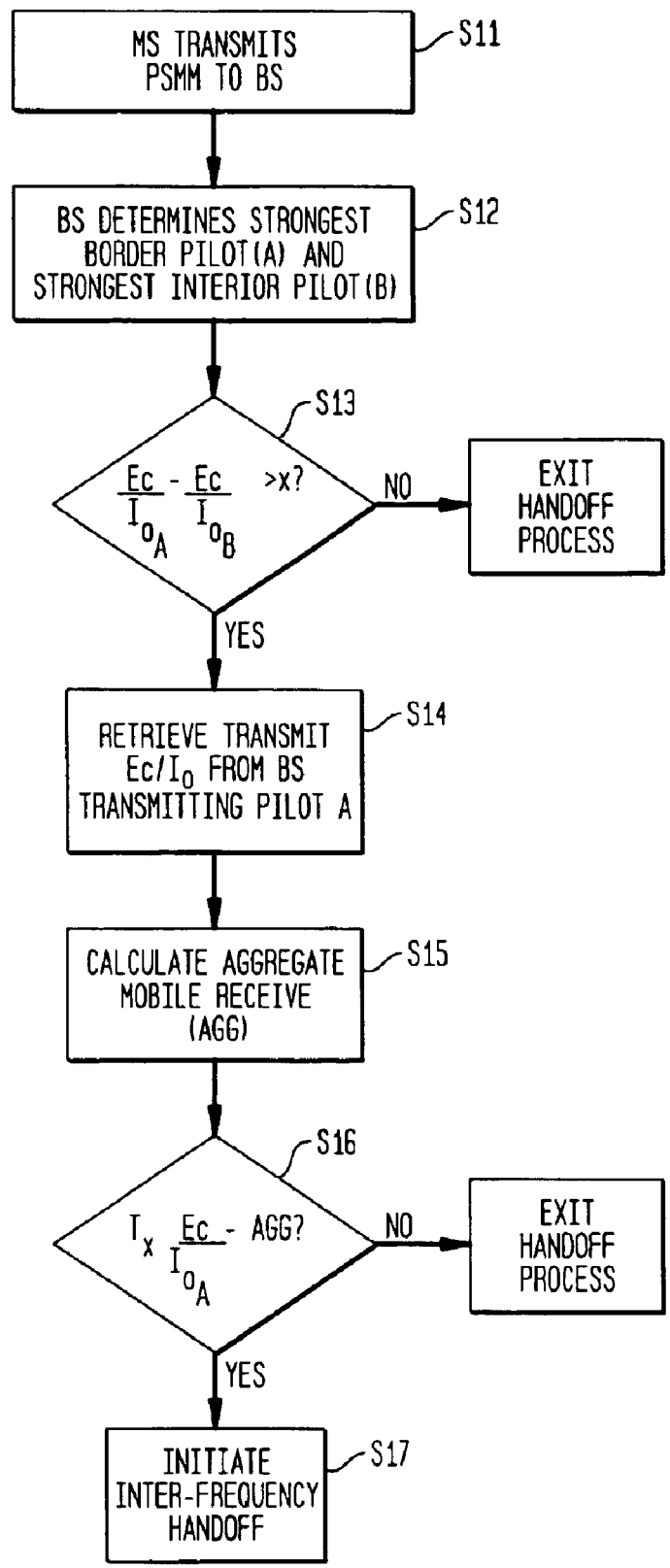
FIG. 3 shows a flowchart illustrating an inter-frequency handoff process in accordance with an aspect of the invention.

A new method for evaluating an inter-frequency handoff in accordance with the principles of the invention is illustrated in the flowchart of FIG. 3, and described hereafter. At step S11 of the flow chart, a particular mobile station transmits a PSMM over the reverse link to the active base stations. Again, the PSMM lists the set of pilot channels detected during repeated searches performed by the mobile station including the pilot energy per chip to the total received power spectral density and PN phase at which each pilot channel was received.

At step S12, the primary base station determines if the active set contains both border pilots and interior pilots. If the active set contains both border pilots and interior pilots, at step S13, the primary base station sorts, by a hardware or software implementation, among the pilot channels, to determine the strongest border pilot and the strongest interior pilot received at the particular mobile station. If the active set contains only border pilots, the handoff trigger method skips to step S15. At step S14, the primary base station computes the difference between the ratios of the pilot energy to total received power measurements (expressed in $$\frac{E_C}{I_O}$$

) of the strongest border pilot, $$\frac{E_C}{I_{OA}},$$

and of the strongest interior pilot, $$\frac{E_C}{I_{OB}},$$

and compares that difference against a Border Pilot versus Interior Pilot metric, X. That metric, X, may be empirically determined by the system operator, and may be customized for a particular cell or base station. Such empirical determination of the threshold metric will ordinarily involve a function of traffic load patterns at a particular cell, geographic terrain, or other factors. If the condition $$\frac{E_C}{I_{OA}} - \frac{E_C}{I_{OB}} > X$$

is not met, the handoff procedure is halted for the particular mobile station.

If the condition $$\frac{E_C}{I_{OA}} - \frac{E_C}{I_{OB}} > X$$

is met, at step S15, the primary base station retrieves the transmitted pilot energy to total transmit power from the particular base station associated with the strongest border pilot channel. At step S16, the primary base station computes what will be referred to as the Mobile Aggregate $$\frac{E_C}{I_O}(\text{``}AGG\text{''}).$$

AGG is calculated as the logarithmic value of the linear sum of the $$\frac{E_C}{I_O}$$

measurements for all active set pilot signals detected at a particular mobile station. Therefore, AGG is calculated as:

$$AGG = 10 \times \log_{10}\left(\sum_{n=1}^{k} 10^{\frac{E_{C}}{10/O_n}}\right)$$

where k=number of active set pilot signals detected at a particular mobile station. At step S16, the active base station computes the transmitted pilot energy to total transmit power $$\frac{TxE_C}{I_O}$$

reported by the base station associated with the strongest border pilot channel (as described below), determines a difference between that value and AGG and compares that difference against a loss metric Y. The transmitted pilot energy to total transmit power $$\frac{TxE_C}{I_O}$$

is calculated as a ratio of the energy transmitted over the pilot signal of the particular base station to the total energy transmitted on the forward link for that particular base station. Therefore, $$\frac{TxE_C}{I_O}$$

is calculated as:

$$\frac{TxE_C}{I_O} = \frac{TxE_{C\_pilot}}{\text{Total\_transmit\_power}}$$

The second loss metric, Y, may be empirically determined by the system operator, and may also be customized for a particular cell or base station. Such empirical determination of the threshold metric will ordinarily involve a function of traffic load patterns at a particular cell, geographical terrain, or other factors. If the condition $$\frac{TxE_C}{I_{OA}} - AGG > Y$$

is not met, the handoff procedure is halted for the particular mobile station. If the condition $$\frac{TxE_C}{I_{OA}} - AGG > Y$$

is met, the inter-frequency handoff process is initiated for the particular mobile station using known techniques in step S18.

It should be noted that the first half of the method (i.e. steps S11 to S15) determines whether the border pilots are stronger than the interior pilots. When the border pilots are stronger than the interior pilots (plus some threshold), the indication is that the mobile station is or is shortly expected to be out of the coverage area of the interior pilots. Alternative methods of determining whether a particular mobile station is out of the coverage area of an interior pilot may additionally be used in accordance with the method of the present invention. For instance, using a triangulation algorithm and base station location data, it is possible to determine the location of the mobile station with a certain degree of accuracy. When a message is transmitted from a particular mobile station to the base station, there is a propagation delay which depends on the distance from the mobile station to the base station. Once a propagation delay is determined, a distance between the mobile station and the base station can be determined. With one more propagation delay between another base station and the mobile station, then two possible points for the mobile station can be determined (where the two radiuses intersect). With a third propagation delay value the mobile station's location can be determined with a certain degree of accuracy. The physical location of the mobile station can determine if a mobile station is within the coverage area of any border pilots. Of course, other location methodologies, such as the Global Positioning System, could also be applied to implement this step of the method of the invention.

Another method of determining whether a mobile station is within the coverage area of a border base station is to determine when a border pilot is added to the active set for a particular mobile station. The Mobile Aggregate $$\frac{E_C}{I_O}$$

is calculated after any border pilot is added and steps S16 to S18 are performed in accordance with the invention.

The embodiment of the above-described inter-frequency handoff trigger features reduced sensitivity to traffic load patterns. Empirical results demonstrate that the trigger of the invention prevents the triggering of an inter-frequency handoff when an interior pilot is the dominant pilot in the active set. Proper adjustment of the associated threshold values can further fine-tune the algorithms for an optimum interfrequency trigger. In particular, the invention features a decreased sensitivity to the overall loading in a cell by calculating the overall load at a particular mobile station and discounting the effect of the loading by using the transmitted loading of the dominant pilot in the active set.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention and is not intended to illustrate all possible forms thereof. It is also understood that the words used are words of description, rather than limitation, and that details of the structure may be varied substantially without departing from the spirit of the invention and the exclusive use of all modifications which come within the scope of the appended claims is reserved.

What is claimed is:

1. A method of evaluating need for handoff of a mobile station in a wireless communication system from a base station operating at a first frequency (hereafter "f1 base station") to a base station operating at a second frequency (hereafter "f2 base station"), said method comprising the steps of:

evaluating a geographic positioning of said mobile station in respect to a signal coverage area of said f1 base station and a signal coverage area of said f2 base station;

computing an aggregate value of a set of pilot energy signals received at said mobile station;

obtaining a value of a pilot energy signal transmitted by said f2 base station and comparing it with said aggregate value; and determining that a hand off of said base station connection should be made if said aggregate value is less than said f2 base station transmitted pilot energy signal value plus a preselected threshold value;

wherein said aggregate value is computed according to the equation:

$$AGG = 10 \times \log_{10}\left(\sum_{n=1}^{k} 10^{\frac{E_C}{10/O_n}}\right)$$

where k=number of active set pilots.

2. The method of claim 1 wherein said aggregate value is determined as a function of a linear sum of ratios of pilot energy to total received power of all active set pilot signals received at said mobile station.

3. The method of claim 1 wherein said f1 base station is associated with a strongest pilot signal received by said mobile station at said first frequency and said f2 base station is associated with a strongest pilot signal received by said mobile station at said second frequency.

4. The method of claim 1 wherein said step of evaluating a geographic positioning includes the substeps of:

determining a value of a first pilot energy signal received at said mobile station from said f1 base station and a value of a second pilot energy signal received at said mobile station from said f2 base station;

computing a difference between said second pilot energy signal value and said first pilot energy signal value; and evaluating said difference against a preselected threshold value.

5. The method of claim 1 wherein said step of evaluating a geographic positioning is carried out by determining a location of said mobile station using a triangulation algorithm and base station location data.

6. The method of claim 5 wherein said triangulation algorithm is computed from propagation delays from said mobile station to at least three of said base stations.

7. In a wireless communication system having a plurality of base stations in communication with a mobile station at a first traffic channel, said mobile station receiving a plurality of active pilot signals, said active pilot signals including at least one border pilot signal and at least one interior pilot signal, a method of evaluating conditions for handoff of a connected call to a new traffic channel, said method comprising the steps of:

determining a signal strength for a strongest border pilot signal at said mobile station and a signal strength for a strongest interior pilot signal at said mobile station and evaluating a difference between said determined signal strengths of said strongest border pilot signal and said strongest interior pilot signal against a first threshold;

determining transmitted pilot energy to total transmit power of said strongest border pilot signal and an aggregate value of all of said active pilot signals at said mobile station and evaluating a difference between said determined transmitted pilot energy to total transmit power and said aggregate value against a second threshold; and making a handoff decision for said mobile station if said determined signal strength of said strongest border pilot signal is greater than said determined signal strength of said strongest interior pilot signal plus said first threshold, and if said transmitted pilot energy to total transmit power of said strongest border pilot signal is greater than said aggregate value plus said second threshold.

8. The method of claim 7 wherein said first traffic channel is defined in terms of a first frequency and said new traffic channel is defined in terms of a second frequency.

9. The method of claim 7 wherein said aggregate value is determined as a function of a linear sum of ratios of pilot energy to total received power of all of said active pilot signals at said mobile station.

10. The method of claim 7 wherein said aggregate value is computed according to the equation:

$$AGG = 10 \times \log_{10}\left(\sum_{n=1}^{k} 10^{\frac{E_C}{10/On}}\right)$$

where k=number of active set pilots.

11. The method of claim 7 wherein said pilot energy to total received power of said at least one border pilot signal is transmitted to said base station via PSMM.

12. The method of claim 7 wherein said first and said second thresholds are empirically determined by a wireless system operator.

13. In a wireless communication system having a plurality of base stations in communication with a mobile station at a first traffic channel, said mobile station receiving a plurality of active pilot signals, said active pilot signals including at least one border pilot signal and at least one interior pilot signal, a method of evaluating conditions for handoff of a connected call to a new traffic channel, said method comprising the steps of:
  adding a new border pilot signal to said plurality of active pilot signals;
  determining a ratio of transmitted pilot energy to total transmit power of a strongest border pilot signal and an aggregate value of ratios of pilot energy to total received power of all of said active pilot signals at said mobile station and evaluating a difference between said determined transmitted pilot energy to total transmit power and said aggregate value against a threshold; and
  making a handoff decision for said mobile station if transmitted pilot energy to total transmit power of said strongest border pilot signal is greater than said aggregate value plus said threshold.

14. The method of claim 13 wherein said first traffic channel is defined over a first frequency and said new traffic channel is defined over a second frequency.

15. The method of claim 13 wherein said pilot energy to total received power of said at least one border pilot signal is transmitted to said base station via PSMM.

16. The method of claim 13 wherein said threshold is empirically determined by a wireless system operator.

17. The method of claim 13 wherein said aggregate value is computed according to the equation:

$$AGG = 10 \times \log_{10}\left(\sum_{n=1}^{k} 10^{\frac{E_C}{10/On}}\right)$$

where k=number of active set pilots.

18. In a wireless communication system having at least one base station in communication with a mobile station at a first frequency, said mobile station receiving a plurality of active pilot signals, said active pilot signals including at least one border pilot signal, a method for triggering handoff of a connected call to a new frequency, said method comprising the steps of:
  determining a ratio of transmitted pilot energy to total transmit power of a strongest border pilot signal and an aggregate value of ratios of pilot energy to total received power of all of said active pilot signals at said mobile station and evaluating a difference between said determined transmitted pilot energy to total transmit power and said aggregate value against a threshold; and
  tuning said mobile station to said new frequency if a ratio of transmitted pilot energy to total transmit power of said strongest border pilot signal is greater than said aggregate value plus said threshold.

19. The method of claim 18 wherein said aggregate value is computed according to the equation:

$$AGG = 10 \times \log_{10}\left(\sum_{n=1}^{k} 10^{\frac{E_C}{10/On}}\right)$$

where k=number of active set pilots.

20. A method of evaluating need for handoff of a mobile station in a wireless communication system from a base station operating at a first frequency (hereafter "f1 base station") to a base station operating at a second frequency (hereafter "f2 base station"), said method comprising the steps of:
  evaluating a geographic positioning of said mobile station in respect to a signal coverage area of said f1 base station and a signal coverage area of said f2 base station;
  computing an aggregate value of a set of pilot energy signals received at said mobile station;
  obtaining a value of a pilot energy signal transmitted by said f2 base station and comparing it with said aggregate value; and
  determining that a hand off of said base station connection should be made if said aggregate value is less than said f2 base station transmitted pilot energy signal value plus a preselected threshold value;
  wherein said step of evaluating a geographic positioning includes the substeps of:
  determining a value of a first pilot energy signal received at said mobile station from said f1 base station and a value of a second pilot energy signal received at said mobile station from said f2 base station;
  computing a difference between said second pilot energy signal value and said first pilot energy signal value; and
  evaluating said difference against a preselected threshold value.

* * * * *